(12) United States Patent
Cheng et al.

(10) Patent No.: US 11,163,553 B2
(45) Date of Patent: Nov. 2, 2021

(54) DATA CONFIGURATION METHOD AND DATA CONFIGURATION APPARATUS

(71) Applicant: Huawei Technologies Co., Ltd., Shenzhen (CN)

(72) Inventors: Baochuan Cheng, Dongguan (CN); Yaping Qiu, Dongguan (CN); Gaosheng Cui, Shenzhen (CN); Jinmiao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 16/522,166

(22) Filed: Jul. 25, 2019

(65) Prior Publication Data

US 2019/0347088 A1 Nov. 14, 2019

Related U.S. Application Data

(63) Continuation of application No. PCT/CN2017/109369, filed on Nov. 3, 2017.

(30) Foreign Application Priority Data

Jan. 26, 2017 (CN) .......................... 201710061740.X

(51) Int. Cl.
*G06F 8/658* (2018.01)
*G06F 16/185* (2019.01)
*G06F 8/72* (2018.01)

(52) U.S. Cl.
CPC .............. *G06F 8/658* (2018.02); *G06F 8/72* (2013.01); *G06F 16/185* (2019.01)

(58) Field of Classification Search
CPC ........... G06F 8/658; G06F 16/185; G06F 8/72
(Continued)

(56) References Cited

U.S. PATENT DOCUMENTS 9,712,447 B2 * 7/2017 Wood ..................... H04L 47/125
9,887,878 B2 * 2/2018 Mahajan ................. H04L 67/12
(Continued)

FOREIGN PATENT DOCUMENTS

CN 1866252 A 11/2006
CN 101006424 A 7/2007
(Continued)

OTHER PUBLICATIONS

Chemeritskiy et al, "Consistent network update without tagging", [Online], 2014, pp. 1-6, [Retrieved from internet on Jun. 3, 2021], <Chemeritskiy et al is cited for teaching Consistent network update without tagging.> (Year: 2014).*
(Continued)

*Primary Examiner* — S. Sough
*Assistant Examiner* — Zengpu Wei
(74) *Attorney, Agent, or Firm* — Conley Rose, P.C.

(57) ABSTRACT

A data configuration mechanism includes determining an upgrade profile based on an original data management model and an updated data management model. One or more data nodes are changed between the original data management model and the updated data management model. The upgrade profile indicates path information of the changed data nodes and indicates an update operation of the changed data nodes. Corresponding data for the changed data nodes are configured based on the path information and the update operation.

20 Claims, 9 Drawing Sheets

(58) Field of Classification Search
USPC .......................................................... 717/168
See application file for complete search history.

(56) References Cited

U.S. PATENT DOCUMENTS

| | | | |
|---|---|---|---|
| 2006/0041881 | A1 | 2/2006 | Adkasthala |
| 2009/0106459 | A1 | 4/2009 | Abels et al. |
| 2012/0096134 | A1* | 4/2012 | Suit ................ H04L 12/6418 709/221 |
| 2014/0082602 | A1 | 3/2014 | Mallur et al. |
| 2015/0074561 | A1 | 3/2015 | Zhou |
| 2016/0380810 | A1* | 12/2016 | Morris ............. H04L 41/0803 370/254 |
| 2017/0223075 | A1 | 8/2017 | Hong et al. |

FOREIGN PATENT DOCUMENTS

| | | | |
|---|---|---|---|
| CN | 102012899 | A | 4/2011 |
| CN | 102364894 | A | 2/2012 |
| CN | 102929745 | A | 2/2013 |
| CN | 103430178 | A | 12/2013 |
| CN | 104137065 | A | 11/2014 |
| CN | 104317556 | A | 1/2015 |
| CN | 106059922 | A | 10/2016 |
| WO | 2005031498 | A2 | 4/2005 |

OTHER PUBLICATIONS

Machine Translation and Abstract of Chinese Publication No. CN102012899, dated Apr. 13, 2011, 13 pages.
Machine Translation and Abstract of Chinese Publication No. CN102364894, dated Feb. 29, 2012, 19 pages.
Machine Translation and Abstract of Chinese Publication No. CN102929745, dated Feb. 13, 2013, 21 pages.
Machine Translation and Abstract of Chinese Publication No. CN103430178, dated Dec. 4, 2013, 18 pages.
Machine Translation and Abstract of Chinese Publication No. CN106059922, dated Oct. 26, 2016, 17 pages.
Bjorklund, M., Ed., "Yang—A Data Modeling Language for the Network Configuration Protocol (NETCONF)," RFC 6020, Oct. 2010, 173 pages.
Foreign Communication From a Counterpart Application, Chinese Application No. 201710061740.X, Chinese Office Action dated Aug. 22, 2019, 9 pages.
Foreign Communication From a Counterpart Application, European Application No. 17894069.8, Extended European Search Report dated Sep. 16, 2019, 14 pages.
Foreign Communication From a Counterpart Application, PCT Application No. PCT/CN2017/109369, English Translation of International Search Report dated Jan. 30, 2018, 2 pages.
Foreign Communication From a Counterpart Application, PCT Application No. PCT/CN2017/109369, English Translation of Written Opinion dated Jan. 30, 2018, 3 pages.

* cited by examiner

DATA CONFIGURATION METHOD AND DATA CONFIGURATION APPARATUS

CROSS-REFERENCE TO RELATED APPLICATIONS

This application is a continuation of International Application No. PCT/CN2017/109369, filed on Nov. 3, 2017, which claims priority to Chinese Patent Application No. 201710061740.X, filed on Jan. 26, 2017. The disclosures of the aforementioned applications are hereby incorporated by reference in their entireties.

TECHNICAL FIELD

Embodiments of the present disclosure relate to the field of network technologies, and in particular, to a data configuration method and a data configuration apparatus.

BACKGROUND

With development of network technologies and constant expansion of a network scale, management and maintenance of network devices become increasingly important. As a secure and efficient network configuration management technology, the Network Configuration Protocol (NETCONF) resolves many problems about current network device configuration. The NETCONF performs data management based on a yang model that is a data management model.

In a NETCONF architecture, original configuration data of a network device is stored in a database of the network device. When the network device starts, the original configuration data can be automatically copied from the database and is used to configure the network device. However, after the yang model is upgraded, if backward compatibility cannot be ensured for the yang model, a new yang model does not match the original configuration data. As a result, the new yang model cannot read the original configuration data, and the network device cannot be configured. In this case, a maintenance person or a customer needs to reconfigure the configuration data, to restore a configuration of the network device and ensure subsequent normal running of the network device. This greatly increases maintenance costs of the network device.

SUMMARY

Embodiments of the present disclosure provide a data configuration method and a data configuration apparatus, so as to automatically reconfigure, based on a difference between a before-upgrade data management model and an after-upgrade data management model during upgrading of a data management model, data for a data node changed during the model upgrade, without a need to manually reconfigure the data based on the after-upgrade model. This can avoid, to some extent, maintenance costs caused by upgrading of the data management model.

To achieve the foregoing objectives, the embodiments of the present disclosure use the following technical solutions:

According to a first aspect of the embodiments of the present disclosure, a data configuration method is provided, including: determining an upgrade profile based on an original data management model and an updated data management model after a data management model is upgraded, where the upgrade profile is used to indicate path information of each changed data node of at least one changed data node in the updated data management model compared with the original data management model, and an update operation of each changed data node of the at least one changed data node; and further, for each changed data node, configuring corresponding data of the changed data node based on the path information of the changed data node and the update operation of the changed data node.

It can be learned that, after the data management model is upgraded, according to the method provided in this application, the upgrade profile can be generated based on a difference between the before-upgrade and after-upgrade data management models. The upgrade profile defines path information of a node changed during upgrading of the data management model, and an update operation of the changed data node. Further, corresponding data of the changed node can be automatically reconfigured by referring to the upgrade profile, without a need to reconfigure the data by a maintenance person based on the after-upgrade model. This reduces maintenance costs caused by upgrading of the data management model, and can implement a smooth upgrade of the data management model.

With reference to the first aspect, in a first possible implementation of the first aspect, the determining an upgrade profile based on an original data management model and an updated data management model includes: obtaining a differential profile based on the original data management model and the updated data management model, where the differential profile is used to indicate a first-type data node being deleted when generating the updated data management model compared with the original data management model, and path information of the first-type data node in the original data management model, and/or a second-type data node being added to the updated data management model compared with the original data management model, and path information of the second-type data node in the updated data management model. In this case, the changed data node includes the first-type data node and/or the second-type data node. Further, the upgrade profile may be further generated based on the differential profile. In the upgrade profile, an update operation of the first-type data node is deletion, and an update operation of the second-type data node is addition.

During upgrading of the data management model, data node changes are classified into two types: deletion and addition. The upgrade profile defines path information, in the original data management model, of a data node being deleted from the original data management model compared with the updated data management model. Therefore, corresponding data of the deleted data node may be obtained based on an indication of the upgrade profile, and deleted. In addition, the upgrade profile defines path information, in the updated data management model, of a data node being added to the updated data management model compared with the original data management model. Therefore, based on an indication of the upgrade profile, corresponding data of the added data node may be stored based on an updated path. In this way, configuration data can be automatically updated during upgrading of the data management model.

With reference to the first possible implementation of the first aspect, in a second possible implementation of the first aspect, the method further includes: if a first data node is the same as a second data node (herein, the first data node is one of the first-type data node, and the second data node is one of the second-type data node), deleting the data node from the original data management model, and adding the data node to the updated data management model, in other words, migrating corresponding data of the data node to a new path.

Therefore, a change profile needs to be determined. The change profile is used to indicate a correspondence between path information of the first data node in the original data management model and path information of the second data node in the updated data management model. The correspondence between the path information of the first data node in the original data management model and the path information of the second data node in the updated data management model is added to the upgrade profile based on the change profile.

Therefore, based on the correspondence between the path information of the first data node in the original data management model and the path information of the second data node in the updated data management model in the upgrade profile, the corresponding data of the first data node can be migrated to the second data node, that is, the data is reconfigured in the updated data management model, thereby implementing data configuration of a changed node.

With reference to the second possible implementation of the first aspect, in a third possible implementation of the first aspect, the method further includes: combining the first data node and the second data node in the upgrade profile into a third data node, recording a corresponding update operation of the third data node as migration, and recording path information of the third data node as path information of the third data node in the original data management model and path information of the third data node in the updated data management model that are in the upgrade profile. The changed data node further includes the third data node.

Herein, the upgrade profile may be adjusted to classify changed data nodes recorded in the upgrade profile into three types: deletion, addition, and migration. It should be noted that the "addition" herein means addition excluding the migration. Similarly, the "deletion" herein means deletion excluding the migration.

With reference to the third possible implementation of the first aspect, in a fourth possible implementation of the first aspect, the method further includes: if corresponding data of the third data node needs to be modified, recording the third data node as a fourth data node in the upgrade profile, and recording a data modification profile of the fourth data node in the upgrade profile. The changed data node further includes the fourth data node.

In other words, the upgrade profile may be further adjusted to classify changed data nodes recorded in the upgrade profile into following types: deletion, addition, migration, and modification. Likewise, the "addition" herein means addition excluding the migration, and the "deletion" herein means deletion excluding the migration.

With reference to the third possible implementation of the first aspect, in a fifth possible implementation of the first aspect, the configuring corresponding data for each changed data node based on the path information of each changed data node of the at least one changed data node and the update operation of each changed data node of the at least one changed data node includes: if determining that a changed data node is the first-type data node and is not the third data node, obtaining corresponding data of the changed data node based on path information of the changed data node in the original data management model, and deleting the corresponding data of the changed data node.

In other words, changed data nodes defined in the upgrade profile are traversed. For a deletion-type data node, corresponding data of the data node is directly deleted. In addition, the deleted data may be further stored in a specified database to provide reference for a user.

With reference to the fourth possible implementation of the first aspect, in a sixth possible implementation of the first aspect, the configuring corresponding data of each changed data node based on the path information of each changed data node of the at least one changed data node and the update operation of each changed data node of the at least one changed data node includes: if determining that a changed data node is the third data node and is not the fourth data node, obtaining the corresponding data of the changed data node based on the path information of the changed data node in the original data management model, and storing the corresponding data of the data node based on the path information of the changed data node in the updated data management model; and/or if determining that a changed data node is the fourth data node, obtaining corresponding data of the changed data node based on path information of the changed data node in the original data management model, modifying the corresponding data of the changed data node based on the corresponding data modification profile of the fourth data node in the upgrade profile, and storing modified data based on path information of the changed data node in the updated data management model; and/or if determining that a changed data node is the second-type data node and is not the third data node, storing corresponding data of the changed data node based on path information of the changed data node in the updated data management model.

In other words, changed data nodes defined in the upgrade profile are traversed. For a migration-type data node, corresponding data of the data node may be migrated based on path information indicated in the upgrade profile. For a modification-type data node, corresponding data of the data node may be modified based on path information and a data modification profile that are indicated in the upgrade profile, and modified data is stored. For an addition-type data node, corresponding data of the data node may be stored based on the upgrade profile.

With reference to any one of the first aspect or the first to sixth possible implementations of the first aspect, in a seventh possible implementation of the first aspect, before the determining an upgrade profile based on an original data management model and an updated data management model, the method further includes: determining version information of the original data management model and version information of the updated data management model; and the determining an upgrade profile based on an original data management model and an updated data management model includes: when determining that the version information of the original data management model is different from the version information of the updated data management model, determining the upgrade profile based on the original data management model and the updated data management model.

In other words, after a version of a data management model is changed, it may be determined that the data management model has been upgraded, and corresponding data of a data node changed in an upgrade process of the data management model needs to be reconfigured.

According to a second aspect of the embodiments of the present disclosure, a data configuration apparatus is provided, including: a determining unit, configured to determine an upgrade profile based on an original data management model and an updated data management model, where the upgrade profile is used to indicate path information of each changed data node of at least one changed data node in the updated data management model compared with the original data management model, and an update operation of each changed data node of the at least one changed data node; and a configuration unit, configured to configure corresponding data for each changed data node of the at least one changed data node based on the path information and the update operation of each changed data node.

With reference to the second aspect, in a first possible implementation of the second aspect, the determining unit is configured to: obtain a differential profile based on the original data management model and the updated data management model, where the differential profile is used to indicate a first-type data node being deleted when generating the updated data management model compared with the original data management model, and path information of the first-type data node in the original data management model, and/or a second-type data node being added when generating the updated data management model compared with the original data management model, and path information of the second-type data node in the updated data management model, and the changed data node includes the first-type data node and/or the second-type data node; and generate the upgrade profile based on the differential profile, where an update operation of the first-type data node is deletion, and an update operation of the second-type data node is addition.

With reference to the first possible implementation of the second aspect, in a second possible implementation of the second aspect, the determining unit is further configured to: if a first data node is the same as a second data node, determine a change profile, where the change profile is used to indicate a correspondence between path information of the first data node in the original data management model and path information of the second data node in the updated data management model, the first data node is one of the first-type data node, and the second data node is one of the second-type data node; and the determining unit is further configured to add the correspondence between the path information of the first data node in the original data management model and the path information of the second data node in the updated data management model to the upgrade profile based on the change profile.

With reference to the second possible implementation of the second aspect, in a third possible implementation of the second aspect, the determining unit is further configured to: combine the first data node and the second data node into a third data node, record a corresponding update operation of the third data node as migration, and record path information of the third data node as path information of the third data node in the original data management model and path information of the third data node in the updated data management model that are in the upgrade profile. The changed data node further includes the third data node.

With reference to the third possible implementation of the second aspect, in a fourth possible implementation of the second aspect, the determining unit is further configured to: if corresponding data of the third data node needs to be modified, record the third data node as a fourth data node in the upgrade profile, and record a data modification profile of the fourth data in the upgrade profile. The changed data node further includes the fourth data node.

With reference to the third possible implementation of the second aspect, in a fifth possible implementation of the second aspect, the configuration unit is further configured to: if determining that a changed data node is the first-type data node and is not the third data node, obtain corresponding data of the changed data node based on path information of the changed data node in the original data management model, and delete the corresponding data of the changed data node.

With reference to the fourth possible implementation of the second aspect, in a sixth possible implementation of the second aspect, the configuration unit is configured to: if determining that a changed data node is the third data node and is not the fourth data node, obtain the corresponding data of the third data node based on the path information of the third data node in the original data management model, and store the corresponding data of the third data node based on the path information of the third data node in the updated data management model; and/or if determining that a changed data node is the fourth data node, obtain corresponding data of the fourth data node based on path information of the fourth data node in the original data management model, modify the corresponding data of the fourth data node based on the corresponding data modification profile of the fourth data node in the upgrade profile, and store modified data based on path information of the fourth data node in the updated data management model; and/or if determining that a changed data node is the second-type data node and is not the third data node, store corresponding data of the changed data node based on path information of the changed data node in the updated data management model.

According to a third aspect, a device is provided. The device includes a memory, a processor, a system bus, and a communications interface. The memory stores code and data. The processor and the memory are connected by using the system bus. The processor runs the code in the memory, so that the device executes the data configuration method provided in any one of the first aspect or the possible implementations of the first aspect.

According to a fourth aspect of the embodiments of the present disclosure, a computer storage medium is provided, configured to store a computer software instruction used by the foregoing data configuration apparatus. The computer software instruction includes a program designed for executing the foregoing data configuration method.

DESCRIPTION OF EMBODIMENTS

Figure 1:
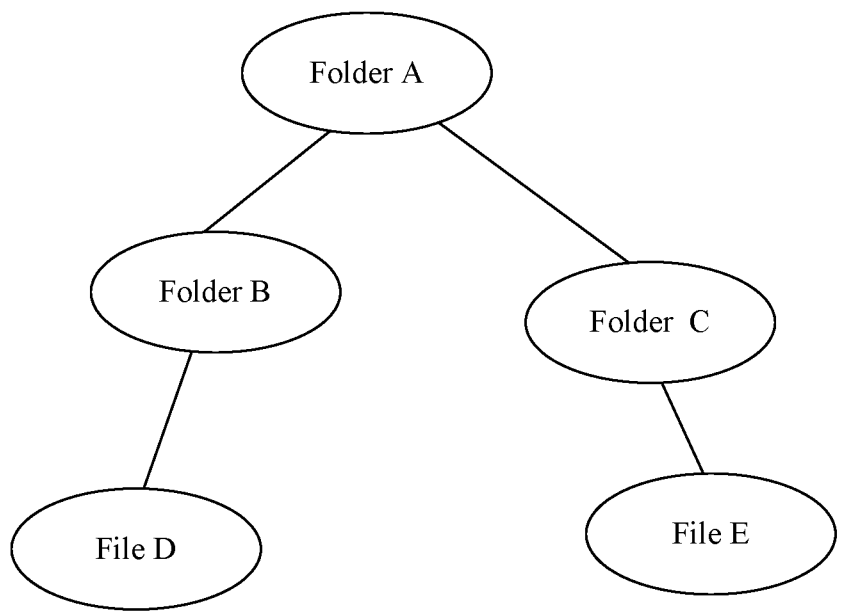
FIG. 1 is a data management model according to an embodiment of the present disclosure.

Currently, secure and efficient configuration management can be implemented for a network device by using a NETCONF architecture. The NETCONF architecture usually uses a yang model as a modeling language. In the NETCONF architecture, original configuration data of a network device is stored in a startup database of the network device. When the network device starts, the original configuration data is automatically copied to a running database from the startup database, to configure the network device. Currently, network devices are diversified, and are upgraded rapidly. Therefore, the yang model also keeps being updated. After the yang model is updated, if backward compatibility cannot be ensured for a new yang model, the new model cannot be used to obtain the original configuration data, and consequently, a configuration of the network device cannot be restored. In this case, a maintenance person or a customer needs to reconfigure the configuration data based on the new yang model. This imposes a relatively high skill requirement for the maintenance person and causes a huge maintenance workload, thereby greatly increasing maintenance costs of the network device. In this application, old configuration data before an update is referred to as original configuration data. The original configuration data may be initial configuration data, or may be configuration data obtained after at least one update.

For example, in a virtual machine service, to provide security for virtual network computing (vnc) access, a vnc password is added. Therefore, a yang model needs to be upgraded. In the original yang model, a storage path of a port number corresponding to a virtual machine is as follows:

```
leaf vnc-port{   //"leaf node" whose node name is "virtual machine port number"//
type int:port-number;   //data type of the "virtual machine port number"//
}
```

In an upgraded yang model, the vnc password is added, the port number corresponding to the virtual machine and the vnc password are stored under a folder vnc, and a storage path is as follows:

```
container vnc{   //"container node" whose node name is "virtual machine"//
    leaf vnc-port{//"leaf node" whose node name is "virtual machine port number"//
type int:port-number;   //port number of a data type//
}
leaf vnc-password{ //"leaf node" whose node name is "virtual machine password"//
        type string;   //data type of the "virtual machine password"//
    }
```

To upgrade the yang model, a maintenance person may first delete the vnc-port field from a database, and then configure vnc, and store the port-number and the password under vnc. In this way, a maintenance workload is huge.

In addition, as stipulated in the RFC6020 protocol, the yang model needs to be backward compatible. If the yang model is in strict line with the stipulation of backward compatibility, a new data structure needs to be added based on a data structure of the original yang model in an upgrade process. In this case, as a quantity of upgrades increases, the yang model becomes increasing poor in readability and logicality, and eventually loses original characteristics and advantages of the yang model, thereby affecting configuration management of the network device.

An embodiment of the present disclosure provides a configuration data update method. A basic principle of the method is: After a data management model is upgraded due to a service requirement, a differential profile between an original data management model and an updated data management model is determined, so as to further determine an upgrade profile based on the differential profile. Then, original configuration data can be automatically updated based on the upgrade profile. Updated configuration data can match the updated data management model, and the configuration data does not need to be manually reconfigured. This can avoid, to some extent, maintenance costs caused by upgrading of the data management model.

First, terms included in the embodiments of the present disclosure are explained and described as follows:

1. Data management model: is a data structure, and is used to manage and configure a network device in the embodiments of the present disclosure. Configuration data and status data, for example, a port number, of the network device are stored based on the data management model. In the embodiments of the present disclosure, the data management model may be a yang model.

2. Data node: is a node at the bottom of a data management model and is used to define data, for example, a leaf node in a tree data structure.

The so-called leaf node is corresponding to one piece of data, has no child node in a schema tree, and is a node at the bottom of the schema tree.

3. Path node: is a node different from a data node in a data management model, and may be used to indicate a storage path of the data node in the data management model, for example, a container node, a list node, and a leaflist node in a tree data structure.

Generally, a structure of a data tree is defined by using the schema tree. How to store data of the yang model may be determined based on the data tree.

The container node, the list node, the leaflist node, and the leaf node are nodes in the data tree. The container node, the list node, and the leaflist node may also be nodes in the schema tree. The container node is an internal node in the schema tree (or the data tree). The container node has no data and has a child node in the schema tree. The list node is an internal node in the schema tree. The list node has no data either, and has a plurality of same-type child nodes in the schema tree. Different child nodes under the list node are identified by using different key values. The leaflist node has a leaf-type child node in the schema tree. Different leaf nodes under the leaflist node are identified by using different identifiers.

In addition, the schema tree further includes choice, case, uses, anyxml, and augment nodes. These nodes are used to define the schema tree. For example, the choice node is used to define a "branch structure" in the schema tree, and is used to indicate that there is a child node under a node (for example, a container node, a list node, or a leaflist node). The case node is used to declare a branch structure of the choice node, for example, a branch under the choice node. The anyxml node is an internal node in the schema tree, and is used to define an unknown data block. The uses node is used to introduce a grouping node. Different grouping nodes are differentiated by using grouping names. The augment node is used to add a new schema tree to a current schema tree.

A data management model shown in FIG. 1 is used as an example. A folder B and a folder C are stored in a folder A, a file D is stored in the folder B, and a file E is stored in the folder C. The folders A, B, and C are path nodes, and the file D and the file E are data nodes. A storage path of the file D is A-B-D, and a storage path of the file E is A-C-E.

Figure 2:
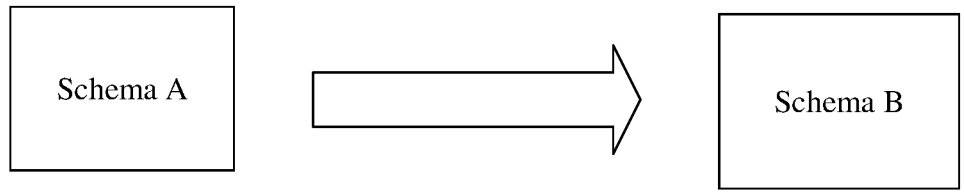
FIG. 2 is a principle diagram of a data configuration method according to an embodiment of the present disclosure.
Figure 2:
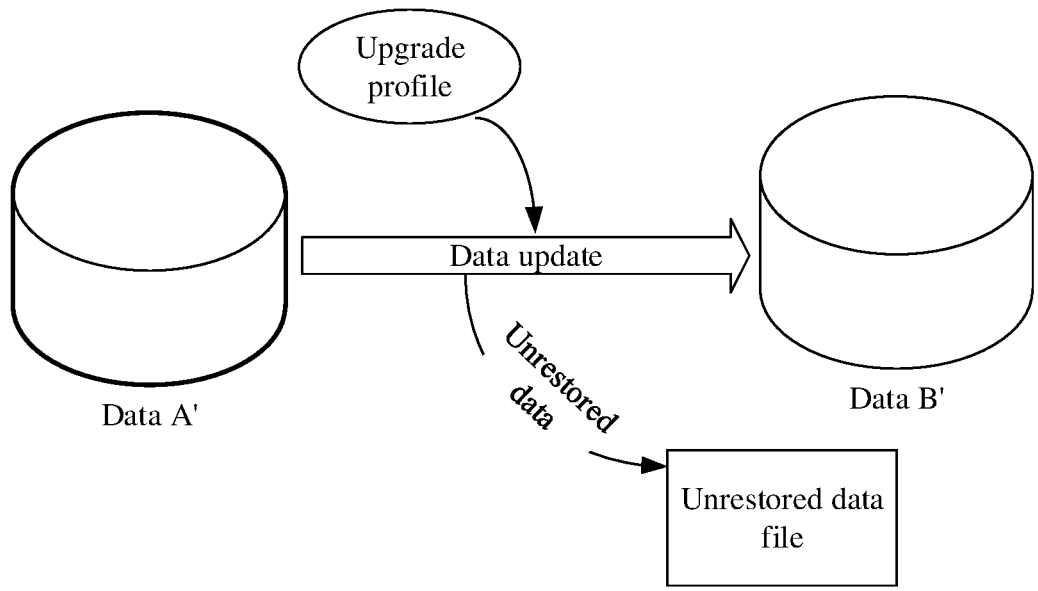

As shown in FIG. 2, FIG. 2 is a principle diagram of a data configuration method according to an embodiment of the present disclosure. Specifically, referring to FIG. 2, when a data management model is upgraded from a schema A to a schema B, data A' (namely, data A') needs to be converted into data B' that conforms to the schema B. An upgrade profile is determined based on a difference between the schema A and the schema B. Original configuration data is converted based on the upgrade profile, to obtain updated configuration data, so as to implement configuration data update after the data management model is upgraded. In addition, during the configuration data update, deleted configuration data is saved into a specified file, for example, into an unrestored data file in FIG. 2, to provide reference for a user and a maintenance person. The updated configuration data is stored in a database (which may be different from a database that stores the original configuration data), and overwrites the original configuration data only when a save instruction delivered by the user is received after a configuration data update process is completed.

Figure 3:
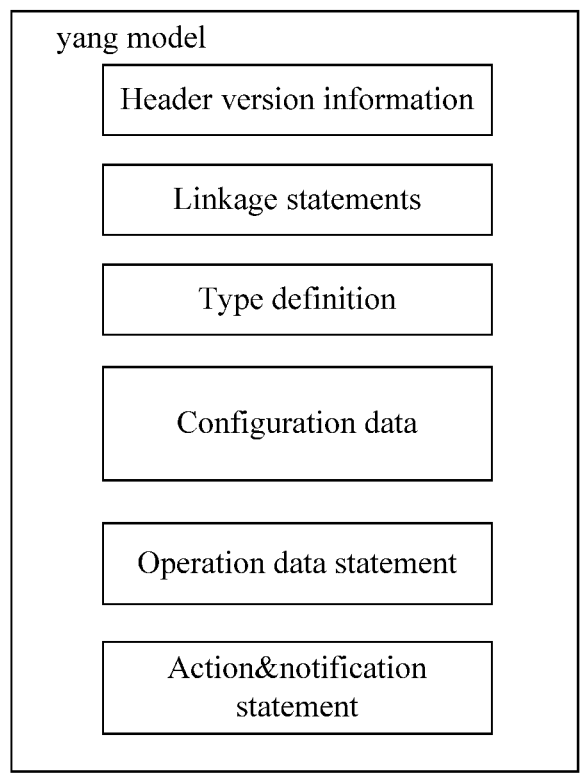
FIG. 3 is a schematic composition diagram of a yang model according to an embodiment of the present disclosure.

Further, information corresponding to the data management model may include version information, configuration data, and the like. A yang model is used as an example. Referring to FIG. 3, the yang model includes the following information: header version information (header information), linkage statements, type definition, configuration data (configuration), an operation data statement, and an action¬ification statement. After the yang model is upgraded, attention needs to be paid only to the header version information and the configuration data. From a perspective of the data management model, attention needs to be paid to the container, list, leaf list, and leaf nodes.

Table 1 provides several possible changes during upgrading of the data management model, and a processing method corresponding to each change.

TABLE 1

| Action (change) | Type (node type) | Attribute (attribute) | Schema (schema) | Data (data processing) |
|---|---|---|---|---|
| Node addition | leaf | default (default) | | Enter a value. |
| | | mandatory (mandatory) | Check | Data processing not required |
| | | when (required at a given moment) | Check | Data processing not required |
| | | range (required in some ranges) | | Data processing not required |
| | | must (must) | Check | Data processing not required |
| | leaflist | | | Data processing not required |
| | list | | | Data processing not required |
| | container | | | Data processing not required |
| | choice | | | Data processing not required |
| | case | | | Data processing not required |
| | uses | | | Data processing not required |
| | anyxml | | | Data processing not required |
| | augment | | | Data processing not required |
| Node deletion | leaf | | | Ignore data, and output to an unrestored file. |
| | leaflist | | | Ignore data, and output to an unrestored file. |
| | list | | | Ignore data recursively, and output to an unrestored file. |
| | container | | | Ignore data recursively, and output to an unrestored file. |
| | choice, case, uses, anyxml, and augment | | | Data processing not required |

TABLE 1-continued

| Action (change) | Type (node type) | Attribute (attribute) | Schema (schema) | Data (data processing) |
|---|---|---|---|---|
| Node migration | leaf | | | Map a value of a source node onto a destination node. |
| | leaflist | | | Map a value of a source node onto a destination node. |
| | list | | | Map a value of a source node onto a destination node. |
| | container | | | Map a value of a source node onto a destination node. |
| Template change | leaf | | Template combination | Fill combined node data into a corresponding template. |
| | leaflist | | Template combination | Fill combined node data into a corresponding template. |
| | list | | Template combination | Fill combined node data into a corresponding template. |
| | container | | Template combination | Fill combined node data into a corresponding template. |
| Attribute change | leaf | default | | Enter a value or ignore. |
| | | type (min, max) (maximum value, minimum value) | | Ignore a value exceeding a range. |
| | | number->enumeration (changing a number type to an enumeration type) | | Processing not required |
| | | empty (changing another type to an empty type) | | Ignore a value. |
| | | union (changing another type to a union type) | | Processing not required |
| | | identity (changing another type to an identity type) | | Processing not required |
| | | enumeration->number (changing an enumeration type to a number type) | | Processing not required |
| | List and leaflist | maxelements (a maximum quantity of included child nodes) | | Ignore a node whose quantity of child nodes exceeds a maximum value. |
| | | minelements (a minimum quanity of included child nodes) | | Ignore a node whose quantity of child nodes exceeds a minimum value. |
| | | orderedby (sorting) | | Change a sorting method. |
| Name change | leaf | | | Map a value of a source node onto a destination node. |
| | leaflist | | | Map a value of a source node onto a destination node. |
| | list | | | Map a value of a source node onto a destination node. |
| | container | | | Map a value of a source node onto a destination node. |

The updated data management model is compared with the original data management model, to obtain the differential profile between them. The differential profile includes a newly added data node in the updated data management model compared with the original data management model, a path of the newly added data node in the updated data management model, a deleted data node from the original data management model compared with the updated data management model, and a path of the deleted data node in the original data management model. Further, the path node may be used to indicate a path of a data node. It should be noted that the node migration change in Table 1 means that a path of a node (for example, the container node, the list node, the leaflist node, or the leaf node) in the original data management model is changed. Child nodes of the container node, the list node, and the leaflist node have corresponding data, and the leaf node has corresponding data. Therefore, the corresponding data of these nodes needs to be migrated to a new path (namely, a path in the updated data management model). The template change means that a structure of the schema tree is changed. Therefore, a path of data in the original data management model is changed. Therefore, the corresponding data of the container node, the list node, the leaflist node, and the leaf node needs to be migrated to a new path. The name change is actually to migrate data from a source node to a new node (a node obtained after the name change), in other words, to perform data migration. In the differential profile, the node migration, the template change, and the name change are represented as deleting a data node from the original data management model and adding the data node to the updated data management model.

In addition, the node migration, the attribute change, and the name change in Table 1 are to migrate a node in the data tree. Therefore, the three changes do not include changes of nodes such as choice, case, uses, anyxml, and augment.

For the foregoing change in which a data node is migrated, a change profile needs to be further provided, to indicate a correspondence between a source path (a path of the data node in the original data management model) and a destination path (a path of the data node in the updated data management model) of the data node. With reference to the differential profile and the change profile, how the data node is changed during updating of the data management model can be learned, so as to complete migration of the data node.

Further, after the data management model is upgraded, the original configuration data may be updated. Specifically, corresponding data processing for a deletion action is that no original data is required. Processing methods for the node migration, the template change, and the name change are the same, and data needs to be mapped from an original data node onto a new data node with reference to the differential profile and the change profile. When a data node is added, no original data exists, and newly added data is stored directly based on the new data management model.

Figure 4:
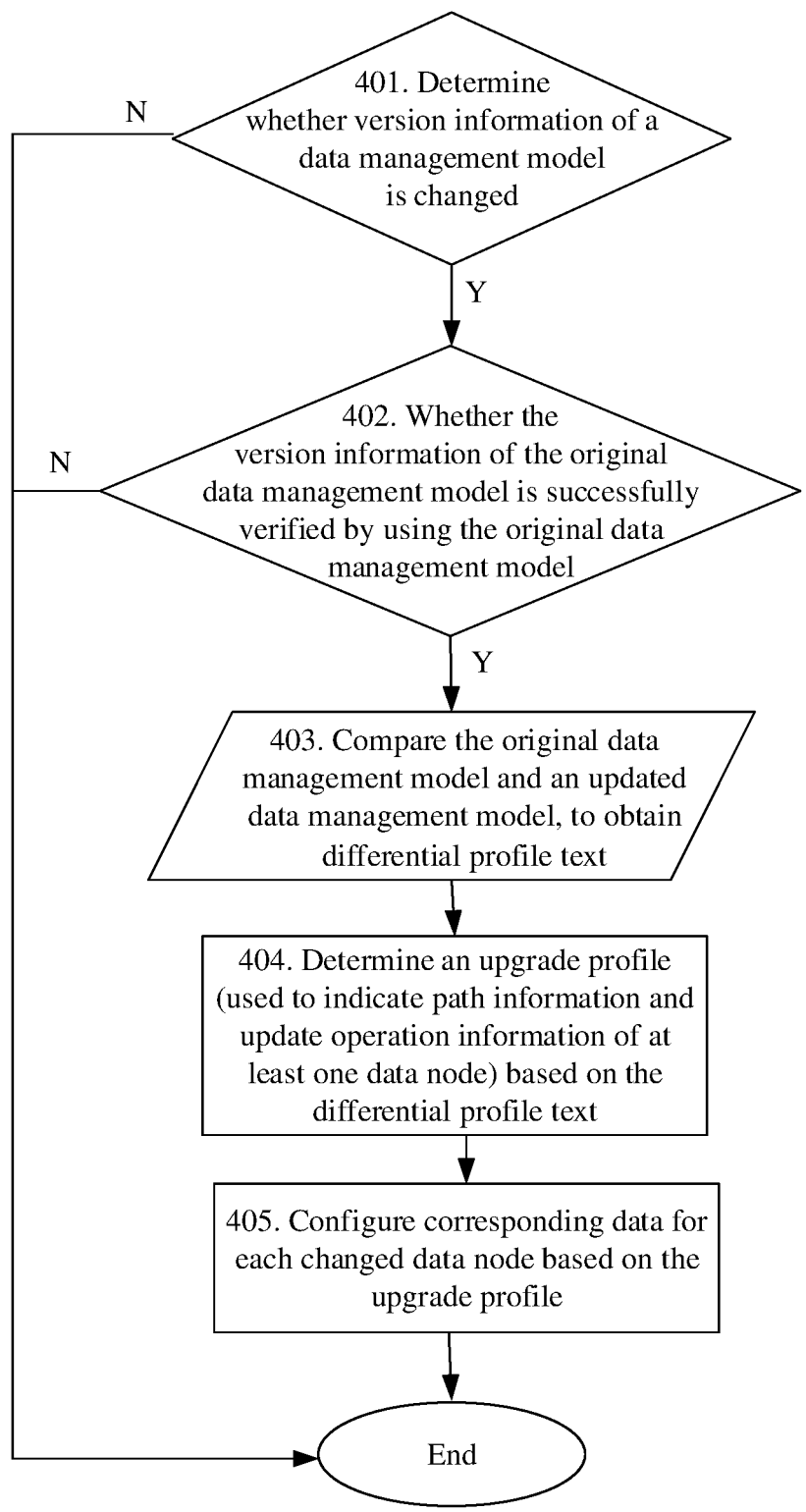
FIG. 4 is a flowchart of a data configuration method according to an embodiment of the present disclosure.

FIG. 4 is a flowchart of a data configuration method according to an embodiment of the present disclosure. As shown in FIG. 4, the method may include the following steps.

401: Determine whether version information of a data management model is changed.

Specifically, the version information of the original data management model and version information of an updated data management model are obtained, and it is determined whether the version information of the original data management model is the same as the version information of the updated data management model. If it is determined that the version information of the original data management model is the same as the version information of the updated data management model, a procedure ends. In other words, the version information of the data management model is not changed, the data management model is not upgraded, and prestored configuration data does not need to be reconfigured. If it is determined that the version information of the original data management model is different from the version information of the updated data management model, it indicates that the version information of the data management model has been changed or the data management model has been upgraded, and for a data node changed during upgrading of the data management model, data needs to be reconfigured based on a change of the data management model. In other words, step 402 is performed.

402: Verify the version information of the original data management model by using the original data management model.

If the verification fails, it indicates that the version information, obtained in step 401, of the original data management model does not match the original data management model, the version information is incorrect, and the procedure ends. If the verification is successful, step 403 is performed.

403: Compare the original data management model and an updated data management model, to obtain a differential profile.

In specific implementation, text code of the original data management model and text code of the updated data management model are obtained; and the text code of the original data management model is compared with the text code of the updated data management model, to obtain the differential profile.

The differential profile is used to indicate a first-type data node being deleted when generating the updated data management model compared with the original data management model, path information of the first-type data node in the original data management model, a second-type data node being added when generating the updated data management model compared with the original data management model, and path information of the second-type data node in the updated data management model. It should be noted that upgrading of the data management model herein is classified into node deletion and node addition. In addition, a path node may be used to indicate the path information of the first-type data node and the path information of the second-type data node.

404: Determine an upgrade profile based on the differential profile, where the upgrade profile is used to indicate path information of each changed data node of at least one changed data node in the updated data management model compared with the original data management model, and an update operation of each changed data node of the at least one changed node.

Specifically, the changed data node includes the first-type data node and the second-type data node. The upgrade profile may be generated based on the first-type data node, an update operation of the first-type data node, the path information of the first-type data node in the original data management model, the second-type data node, an update operation of the second-type data node, and the path information of the second-type data node in the updated data management model.

In the upgrade profile, the update operation of the first-type data node is deletion, and the update operation of the second-type data node is addition. Further, a corresponding update operation of a path node corresponding to the first-type data node may be modification or deletion, and a corresponding update operation of a path node corresponding to the second-type data node may be modification or addition. If an update operation of a path node is modification, it indicates that a data node under the path node is to be modified, specifically, the data node may be to be deleted or added. If an update operation of a path node is deletion, it indicates that all nodes under the path node are to be deleted, including a path node and a data node. If an update operation of a path node is addition, a node needs to be added under the path node, and the node may include a data node and a path node.

405: Configure corresponding data for each changed data node based on the upgrade profile.

In specific implementation, if the upgrade profile does not include a data node, it indicates that a path of the data node is not changed during upgrading of the data management model. If the upgrade profile includes a data node, it indicates that a path of the data node is changed during upgrading of the data management model. In other words, the data node is a changed data node. In this case, the data node is updated based on corresponding path information of the data node in the upgrade profile and a corresponding update operation of the node in the upgrade profile.

In addition, another database is created in an upgrade process. If a path of a data node is not changed, it indicates that the upgrade profile does not include the data node. In this case, corresponding data of the data node is directly copied to the created database.

That the data node is updated based on corresponding path information of the data node in the upgrade profile and a corresponding update operation of the data node in the upgrade profile includes: if the changed data node is the first-type data node, that is, the update operation of the data node in the upgrade profile is deletion, corresponding data of the data node is obtained based on path information of the data node in the original data management model, and the corresponding data of the data node is deleted. In addition, the deleted corresponding data of the data node may be stored in a specified file, for example, an unrestored data file.

In addition, for the second-type data node whose update operation is addition in the upgrade profile, corresponding data of the second-type data node is stored based on the path information of the second-type data node in the updated data management model.

Further, for a data node that needs to be migrated, a comparison result (namely, the differential profile) of the text code of the original data management model and the text code of the updated data management model is to delete a node (may be a data node or a path node) from the original data management model and add the node to the updated data management model. In this case, corresponding data of the node deleted from the original data management model needs to be used for the node added to the updated data management model. However, a correspondence between the original node and the new node cannot be identified in the upgrade profile obtained based on the comparison result. Therefore, a change profile needs to be defined. After the data management model is upgraded, the correspondence between the original node and the new node is determined based on the change profile, and data migration may be further completed based on the correspondence. In the upgrade process of the data management model, possible data migration changes include a name change and a template change. The name change is to change a name of a data node or a path node. In this case, a data storage path is not changed. The template change is to change a data storage path. For example, data is stored in a file A in the original data management model, and is stored in a file B in the updated data management model; however, the data itself is not changed. In addition, during upgrading of the data management model, corresponding data of a data node may be further modified. During data modification, a path of the data node may keep unchanged. In this case, the data node is not reflected in the upgrade profile, and additional processing needs to be performed on the data node. That is, the corresponding data of the data node is read based on the path of the data node, the data is modified, and modified data is stored based on the path of the data node. During data modification, the path of the data node may alternatively be changed. In this case, the data node is reflected in the upgrade profile. This case belongs to data migration.

Based on the change profile, corresponding nodes before and after a change may be mapped. In specific implementation, if a first data node in the first-type data node is the same as a second data node in the second-type data node, that is, during upgrading of the data management model, a data node is deleted from the original data management model, and the data node is also added to the updated data management model, the change profile is further determined. The change profile may indicate a correspondence between path information of the first data node in the original data management model and path information of the second data node in the updated data management model. The correspondence between the path information of the first data node in the original data management model and the path information of the second data node in the updated data management model is added to the upgrade profile based on the change profile. In this way, data migration can be completed based on the upgrade profile. That is, corresponding data of a data node is obtained based on path information of the data node in the original data management model, and then the obtained data is stored based on path information of the data node in the updated data management model. In a possible implementation, a same data node in the first-type data node and the second-type data node may be further defined as a third data node. A corresponding update operation of the third data node is recorded as migration. In the upgrade profile, path information of the third data node is recorded as a path of the third data node in the original data management model and a path of the third data node in the updated data management model.

Further, if corresponding data of the third data node needs to be modified, the third data node is recorded as a fourth data node in the upgrade profile, and a data modification profile of the fourth data node is recorded in the upgrade profile. Therefore, corresponding data of the fourth data node is obtained based on path information of the fourth data node in the original data management model, the obtained data is modified based on the data modification profile, and then modified data is stored based on path information of the fourth data node in the updated data management model.

Figure 5:
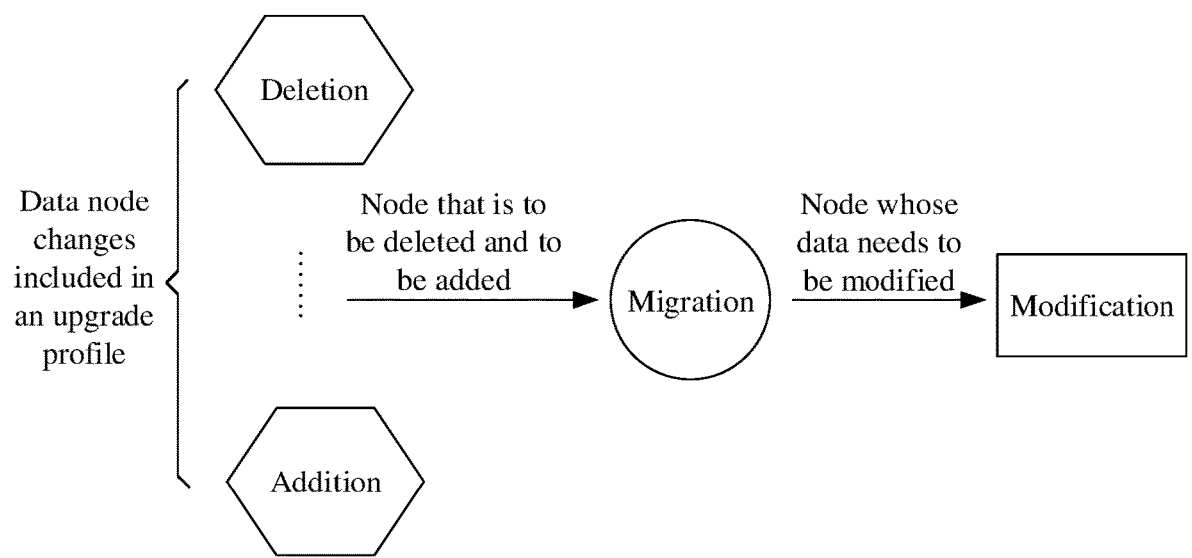
FIG. 5 is a schematic diagram of data node changes according to an embodiment of the present disclosure.

As shown in FIG. 5, data node update operations during upgrading of the data management model include deletion and addition. Further, if a data node is deleted from the original data management model, and the data node is added to the updated data management model, it indicates that corresponding data of the data node needs to be migrated. In this case, the data node update operations further include migration. Further, if the data further needs to be modified in a data migration process, the data node update operations may further include modification.

In specific implementation, a tree data structure may be used to represent the upgrade profile. A data node may be a leaf node at the bottom of the tree data structure, and path information of the data node is described by using a path node. The path node may be a node, other than the leaf node, in the tree structure. It should be noted that in the tree data structure, once a leaf node is modified (for example, added, deleted, migrated, or modified), a corresponding update operation of a path node indicating a path of the leaf node is also modification.

Further, the tree data structure may be filtered. Specifically, for a path node whose update operation is modification in the tree data structure, if it is determined that an upper-level node of the path node has only the path node in the tree data structure, the upper-level node of the path node and the path node are combined. In addition, for a path node whose update operation is deletion in the tree data structure, if the path node includes a child node, all lower-level nodes of the path node are deleted, and only the path node is retained.

The following uses a virtual machine service (a corresponding data management model is a yang model) as an example to describe the data configuration method provided in this embodiment of the present disclosure.

Step 1: In the virtual machine service, to ensure security of virtual machine access, a vnc password is added. Therefore, change of the yang model is required for upgrading. In the original yang model, a storage path of a port number corresponding to the virtual machine is as follows:

```
leaf vnc-port{    //"leaf node" whose node name is "virtual machine
port number"//
Type int:port-number;    //data type of the "virtual machine port number"//
}
```

In an upgraded yang model, the vnc password is added, the port number corresponding to the virtual machine and the vnc password are stored under a folder vnc, and a storage path is as follows:

```
container vnc{    //"container node" whose node name is "virtual
machine"//
    leaf vnc-port{    //"leaf node" whose node name is "virtual
        machine port number"//
type int:port-number;    //data type of the "virtual machine port number"//
}
leaf vnc-password{    //"leaf node" whose node name is "virtual machine
password"//
type string;    //data type of the "virtual machine password"//
}
```

Further, the following differential profile may be generated:

| // | old: test 1 (2015-10-19)test1.yang | version information of the original data management model |
|---|---|---|
| // | new: test 2 (2016-09-09)test2.yang | version information of the updated data management model |
| D | revision'2015-10-19' | deleting a version "2015-10-19" |
| A | revision '2016-09-09' | adding a version "2016-09-09" |
| M | container virtual-machines | modifying a container node whose node name is "virtual machine" |
| M | list virtual-machine | modifying a list node whose node name is "virtual machine" |
|   | D leaf vnc-port | deleting a leaf node" whose node name is "virtual machine port number" |
|   | A container vnc | adding a container node whose node name is "virtual machine" |
|   | A leaf vnc-port | adding a leaf node whose node name is "virtual machine port number" |
|   | A leaf vnc-password | adding a leaf node whose node name is "virtual machine password" |

In the differential profile, A represents addition, D represents deletion, and M represents modification. Because a data node is changed, an update operation of a path node corresponding to the data node in the differential profile is modification.

Step 2: Parse a differential profile, and convert the differential profile into a differential tree shown in FIG. 6.

Figure 6:
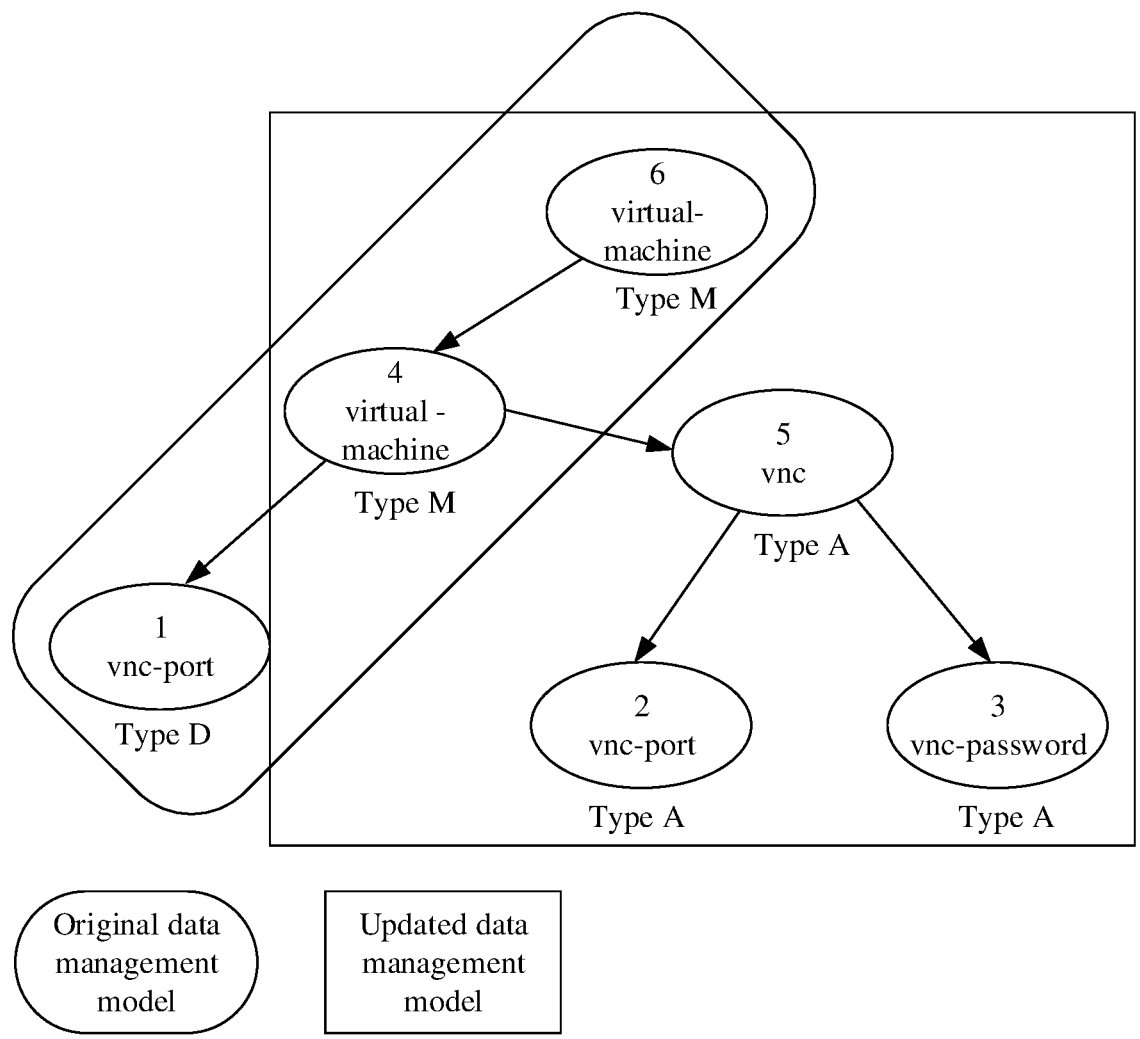
FIG. 6 is a schematic diagram of a differential tree according to an embodiment of the present disclosure.

Referring to FIG. 6, the differential tree indicates a node name of each node, and a corresponding update operation of each node, for example, addition, deletion, migration, or modification. It should be noted that the "addition" herein means addition excluding the migration. Similarly, the "deletion" herein means deletion excluding the migration. An added node (may be a data node or a path node) is denoted as a type-A node in the differential tree, a deleted node (may be a data node or a path node) is denoted as a type-D node in the differential tree, and a modified node (may be a data node or a path node) is denoted as a type-M node in the differential tree. In addition, when a lower-level node is changed, a type of an upper-level node is certainly M.

Specifically, referring to FIG. 6, nodes 1, 2, and 3 are data nodes, nodes 4, 5, and 6 are path nodes, and the path nodes are used to indicate paths of the data nodes in the yang model. Further, the node 6 is a container-type node and a node name is "virtual-machine". The node 4 is a list-type node and a node name is "virtual-machine" (one of same-type folders under the node 6). The node 1 is a leaf-type node, namely, a data node, and a node name is "vnc-port". The nodes 6->4->1 indicate a path of the node 1 (namely, the "vnc-port") in the original yang model. The node 5 is a container-type node and a node name is "vnc". The node 2 is a leaf-type node and a node name is "vnc-port". The node 3 is a leaf-type node and a node name is "vnc-password". The nodes 6->4->5->2 indicate a path of the node 2 (namely, the vnc-port) in the updated yang model. The nodes 6->4->5->3 indicate a path of the node 3 (namely, the vnc-password) in the updated yang model.

In the differential tree, the vnc-port is a to-be-deleted data node in the original yang model and a to-be-added data node in the updated yang model. Actually, the vnc-port is migrated from a path in the original yang model to a path in the updated yang model. For a migration-type data node, a change profile needs to be determined, to indicate a correspondence between a path of the data node in the original yang model and a path of the data node in the updated yang model.

Specifically, the change profile is divided into a change header and a change body. The change header describes namespace of the yang model, and is used to index a plurality of yang models. The change body describes a mapping relationship between a source path before a specific node is changed and a destination path after the change. The source path is a path of the node in the original yang model, and the destination path is a path of the node in the updated yang model.

For example, a change header of a change profile may be nm:"urn:ietf:params:xml:ns:yang:ietf-xx", and is used to define namespace of a yang model. Different yang models are differentiated by using different namespace. A change profile may include a plurality of namespace that may be defined by using different character strings.

(1) An example of a change body for a node migration type is as follows:
source path:/nm:path_xx/nm:nodename_xx
destination path:/nm:path_xx/nm:nodename_xx
This example indicates the source path and the destination path of node migration. The source path and the destination path include all paths from a root node to a changed node.

(2) An example of a change body for a template combination type is as follows:

---
source path: /nm:path_1/nm:nodename_1
/nm:path_2/nm:nodename_2
...
/nm:path_n/nm:nodename_n
destination path: /nm:path_xx/nm:nodename_xx
---

Template combination means that a plurality of changed nodes are combined into a destination path to form a template. Herein, source paths of various changed nodes and a same destination path corresponding to the changed nodes are provided.

(3) An example of a change body for a template data reference type is as follows:

When one template is corresponding to a plurality of groups of data, a reference relationship of the data is required. The reference relationship is optional. If the reference relationship is not provided by a user, reference is performed in a default order, where
referencing: nm:xx_key referenced: nm:xx_key
In template combination, when a same changed node is added to a plurality of templates, corresponding data of the changed node is referenced by the plurality of templates. Different templates referencing the data may be differentiated by using specified keys.

In an example in which a vnc password is added for a virtual machine, a change profile is as follows:

---
nm:"urn:huawei:params:xml:ns:yang:huawei-vm-management" namespace
<source>nm:huawei- vm-management/virtual-machines
/virtual-machine/vnc-port  source path of a changed node "vnc-port"
<destination> nm:huawei- vm-management/virtual-machines
/virtual-machine/vnc/vnc-port  destination path of the changed node
"vnc-port"
---

In other words, the vnc-port is migrated from the virtual-machine to the vnc.

Step 3: A migration path of a data node may be indicated in the differential tree based on a change profile.

Figure 7:
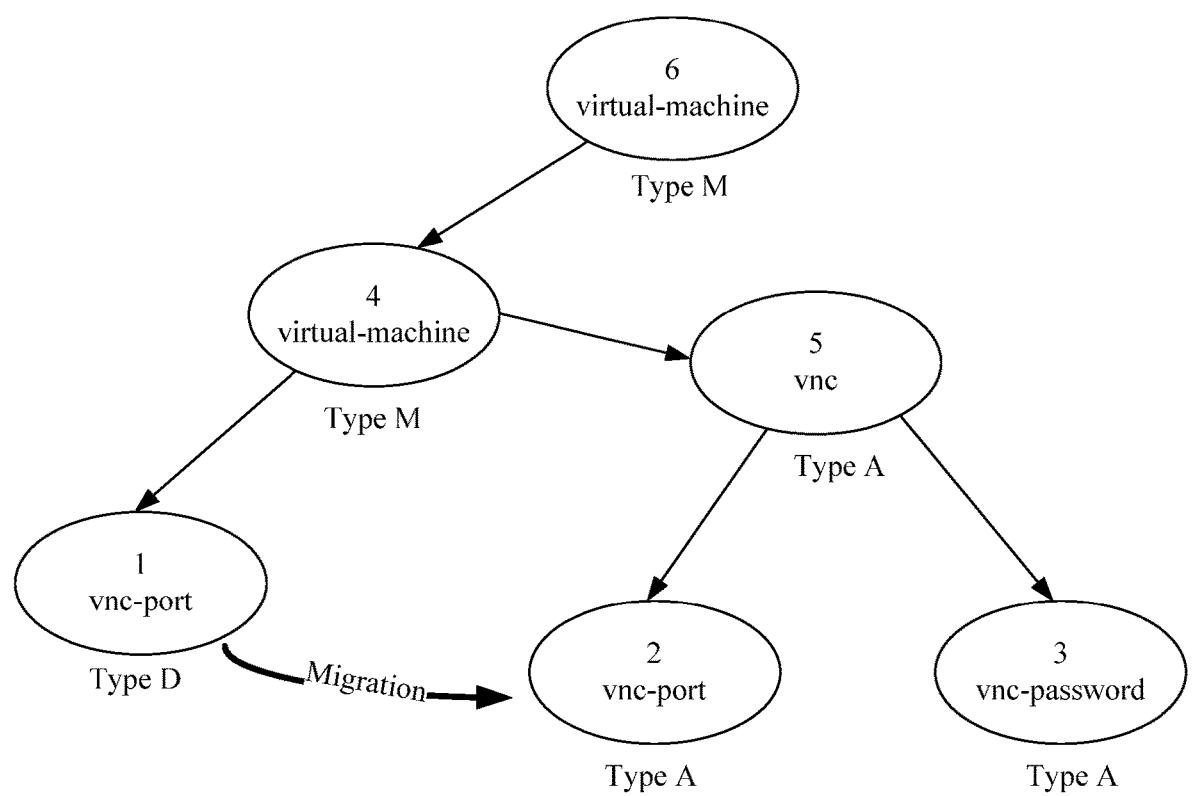
FIG. 7 is another schematic diagram of a differential tree according to an embodiment of the present disclosure.

For example, as shown in FIG. 7, a data node migration direction is indicated by using an arrow in the differential tree shown in FIG. 6. That is, corresponding data of a node 1 is migrated to a node 2.

Step 4: Filter the differential tree to obtain a target tree.

Figure 8:
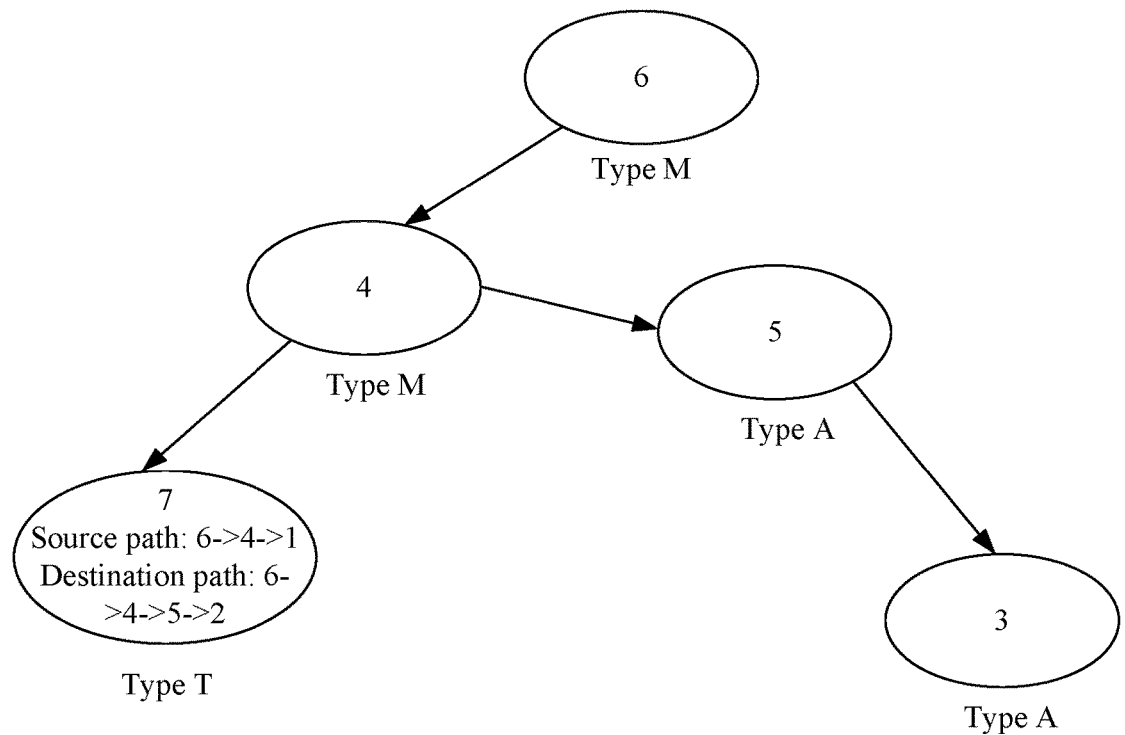
FIG. 8 is another schematic diagram of a differential tree according to an embodiment of the present disclosure.

In specific implementation, filtering the differential tree, namely, combining nodes in the differential tree, may be performed in the following two cases:

(1) Node migration: Based on the change profile, a source node and a destination node of node migration may be obtained. The node migration is identified as two independent actions, namely, addition and deletion in the differential tree. A to-be-deleted data node in the original yang model and a corresponding to-be-added data node in the updated yang model may be combined into one data node. A corresponding update operation of the data node is recorded as migration (type T), and path information of the data node is recorded as path information of the data node in the original yang model and path information of the data node in the updated yang model. As shown in FIG. 8, the nodes 1 and 2 in FIG. 7 are combined into a node 7 in FIG. 8, and a node name of the node is "vnc-port". A corresponding update operation of the node 7 is added and recorded as migration. Path information of the node 7 is recorded as source path information and destination path information.

(2) Template update: Actually, data migration is performed. In addition, a path node of a migrated data node in the differential tree also needs to be updated.

Figure 9:
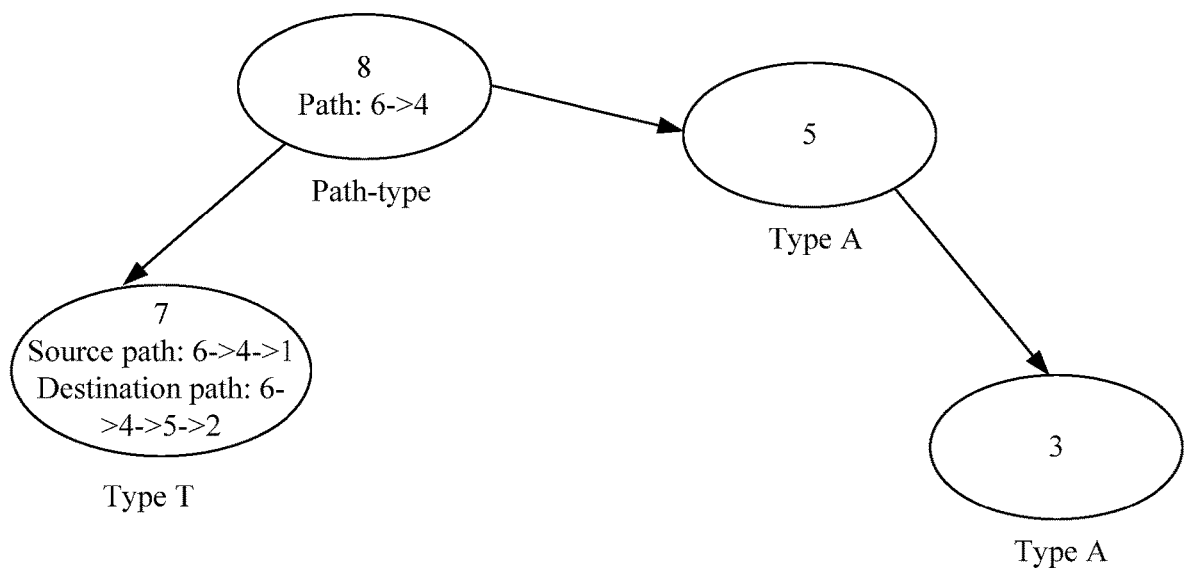
FIG. 9 is a schematic diagram of a target tree according to an embodiment of the present disclosure.

The differential tree includes each related changed node. However, nodes of the container type, the list type, a choice type, and the like (namely, the path nodes in the embodiments of the present disclosure) do not have corresponding data. Changes of the nodes are merely used to finally indicate paths of leaf nodes. The container node includes a group of child nodes, and the container node is not corresponding to data. The list node includes a group of child nodes of a same type, and different child nodes are indexed by using different keys. The choice node indicates a path that may be selected, and is used to select a different branch with reference to a cease node. Therefore, a path node whose type is M (namely, an update operation is modification) may be filtered out, and only a leaf node is retained. When an upper-level node of a path node has no child node, the path node and the upper-level node of the path node may be combined into a node whose type is path. For example, as shown in FIG. 9, nodes 6 and 4 in FIG. 8 are combined into a node 8 in FIG. 9, and a path of the node 8 is 6->4.

In addition, for processing on the deletion and addition actions, an endmost leaf node needs to be retained for the addition action. Once a node is deleted, a child node under the node does not need to be processed. Therefore, only a top parent node is retained for the deletion action. For example, an update operation corresponding to the node 1 in FIG. 7 is deletion, and the node 1 is a node at the bottom of the differential tree. It is assumed that there is still a child node under the node 1. Only the node 1 is retained during processing.

A differential tree obtained after filtering forms the target tree. The target tree herein is an implementation of the upgrade profile in the present disclosure. The target tree includes an update operation of a data node, and the update operation may be addition, deletion, or migration. In addition, the target tree does not include repeated nodes.

An entire mapping path of a data node (namely, a path of a migrated node) may be described by using an endmost node (namely, a data node) and a path-type node (namely, a path node). For example, mapping of the corresponding data of the node 1 onto the node 2 in FIG. 7 may be implemented based on an update operation of a node 7 in FIG. 9 and a path-type node 8 corresponding to the node 7. Data of an added node 3 may be stored based on a path 8->5->3.

Step 5: Traverse the target tree based on original configuration data in a startup database, to complete data mapping.

In specific implementation, if the target tree includes a data node, the data node is updated based on corresponding path information of the data node in the target tree and an update operation corresponding to each node in the target tree.

For example, if the data node is a type-D node, corresponding data of the data node is obtained based on a source path of the data node in the original data management, and the corresponding data of the data node is deleted.

If the data node is a type-T data node, corresponding data of the data node is obtained based on a source path of the data node, and the corresponding data of the data node is stored based on a destination path of the data node.

If the data node is a type-M data node, corresponding data of the data node is obtained based on a source path of the data node, the corresponding data of the data node is modified based on a corresponding data modification profile of the data node, and modified data is stored based on a destination path of the data node.

For a type-A data node in the target tree, corresponding data of the data node is stored based on path information of the data node in the yang model.

Data for which mapping is completed is stored in a candidate database. After the user confirms that the service is normally upgraded, the user enters a configuration saving command. Then after-upgrade data is copied to the startup database to overwrite the original data, so as to ensure that the before-upgrade data can be restored in previous procedures. In addition, deleted data in an upgrade process and data that fails in mapping are output to an unrestored data file, to provide reference for the user.

According to the data configuration method provided in this embodiment of the present disclosure, after the data management model is upgraded, the upgrade profile can be generated based on a difference between the before-upgrade and after-upgrade data management models. The upgrade profile defines path information of a data node changed during upgrading of the data management model, and an update operation of the changed data node. Further, corresponding data of the changed data node can be automatically reconfigured by referring to the upgrade profile, without a need to reconfigure the data by a maintenance person based on the after-upgrade model. This reduces maintenance costs caused by upgrading of the data management model, and can implement a smooth upgrade of the data management model.

Figure 10:
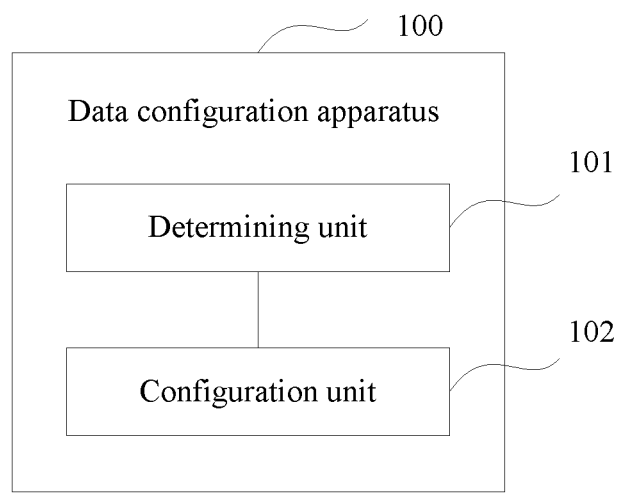
FIG. 10 is a schematic structural diagram of a data configuration apparatus according to an embodiment of the present disclosure.

An embodiment of the present disclosure provides a data configuration apparatus. As shown in FIG. 10, the apparatus 100 includes a determining unit 101 and a configuration unit 102.

The determining unit 101 is configured to support the data configuration apparatus in performing step 401 in the data configuration method shown in FIG. 4. The configuration unit 102 is configured to support the data configuration apparatus in performing steps 401 to 404 in the data configuration method shown in FIG. 4. The configuration unit 102 is configured to support the data configuration apparatus in performing step 405 in the data configuration method shown in FIG. 4.

It should be noted that all related content of various steps in the foregoing method embodiment may be cited in function descriptions of corresponding functional modules. Details are not described herein again.

The data configuration apparatus provided in this embodiment of the present disclosure is configured to execute the foregoing data configuration method, and therefore, can achieve a same effect as the foregoing data configuration method.

Figure 11:
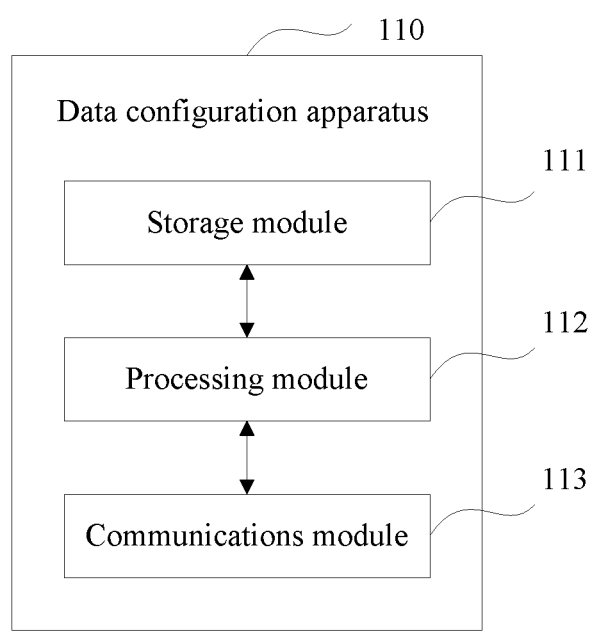
FIG. 11 is a schematic structural diagram of another data configuration apparatus according to an embodiment of the present disclosure.

When an integrated unit is used, FIG. 11 shows another possible schematic composition diagram of the data configuration apparatus in the foregoing embodiment. As shown in FIG. 11, the data configuration apparatus 110 includes a processing module 112 and a communications module 113.

The processing module 112 is configured to control and management an action of the data configuration apparatus. The communications module 113 is configured to support the data configuration apparatus in communicating with another network entity. The data configuration apparatus may further include a storage module 111, configured to store program code and data of the data configuration apparatus.

The processing module 112 may be a processor or a controller. The processing module 112 may implement or execute examples of various logical blocks, modules, and circuits that are described with reference to the content disclosed in the present disclosure. The processor may also be a combination implementing a computing function, for example, a combination including one or more microprocessors, or a combination of a DSP and a microprocessor. The communications module 113 may be a transceiver, a transceiver circuit, a communications interface, or the like. The storage module 111 may be a memory.

Figure 12:
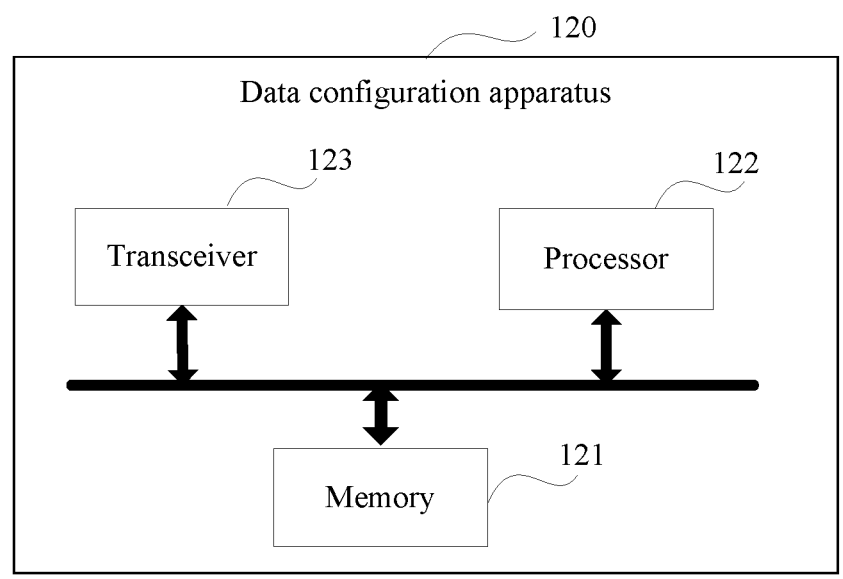
FIG. 12 is a schematic structural diagram of still another data configuration apparatus according to an embodiment of the present disclosure.

When the processing module 112 is the processor, the communications module 113 is the transceiver, and the storage module 111 is the memory, the data configuration apparatus in this embodiment of the present disclosure may be a data configuration apparatus shown in FIG. 12.

As shown in FIG. 12, the data configuration apparatus 120 includes a processor 122, a transceiver 123, a memory 121, and a bus 124. The transceiver 123, the processor 122, and the memory 121 are interconnected by using the bus 124. The bus 124 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 12, but this does not mean that there is only one bus or only one type of bus.

The foregoing descriptions about implementations allow a person skilled in the art to understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of the present disclosure or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data configuration method fora network device comprising a processor coupled to a memory, wherein the method comprises:
    obtaining, with the processor, a differential profile for one or more changed data nodes based on an original data management model and an updated data management model, wherein the one or more changed data nodes comprise a first-type data node that is deleted and a second-type data node that is added;
    determining a change profile when a deletion node in the original data management model is an addition node in the updated data management model, wherein the change profile indicates a correspondence between path information of the deletion node in the original data management model and path information of the addition node in the updated data management model;
    combining the deletion node and the addition node into a migration node, wherein the one or more changed data nodes further comprise the migration node;
    determining, with the processor, an upgrade profile in response to obtaining the differential profile for the one or more changed data nodes, wherein the one or more changed data nodes are changed between the original data management model and the updated data management model, and wherein the upgrade profile indicates first path information of the first-type data node, second path information of the second-type data node, and an update operation of the one or more changed data nodes; and
    automatically reconfiguring, with the processor, corresponding data for the second-type data node based on the first path information, the second path information, and the update operation in the upgrade profile to permit the network device to upgrade from the original data management model to the updated data management mode without manual reconfiguration.

2. The data configuration method of claim 1, wherein determining the upgrade profile comprises:
    obtaining the differential profile including differences between the original data management model and the updated data management model, wherein the differential profile indicates the first-type data node deleted when generating the updated data management model from the original data management model and the first path information of the first-type data node in the original data management model, and indicates the second-type data node added when generating the updated data management model from the original data management model and the second path information of the second-type data node in the updated data management model; and
    generating the upgrade profile based on the differential profile.

3. The data configuration method of claim 2, wherein the method further comprises:
    adding the correspondence between the path information of the deletion node and the path information of the addition node in the updated data management model to the upgrade profile based on the change profile.

4. The data configuration method of claim 3, wherein the method further comprises:
    recording a corresponding update operation of the migration node as migration; and
    recording path information of the migration node as path information of the migration node in the original data management model and path information of the migration node in the updated data management model in the upgrade profile.

5. The data configuration method of claim 4, wherein the method further comprises:
    recording the migration node as a modification node in the upgrade profile when corresponding data of the migration node is modified; and
    recording a data modification profile of the modification node in the upgrade profile, wherein the one or more changed data nodes further comprise the modification node.

6. The data configuration method of claim 4, wherein configuring corresponding data for the one or more changed data nodes comprises:
    obtaining data of a specified changed data node based on path information of the specified changed data node in the original data management model in response to determining the specified changed data node is a first-type data node and not the migration node; and
    deleting the data of the specified changed data node.

7. The data configuration method of claim 5, wherein configuring data for the one or more changed data nodes comprises:
    obtaining the data of the migration node based on the path information of the migration node in the original data management model in response to determining a specified changed data node is the migration node and not the modification node; and storing the data of the migration node based on the path information of the migration node in the updated data management model.

8. The data configuration method of claim 5, wherein configuring data for the one or more changed data nodes comprises:
obtaining data of the modification node based on path information of the modification node in the original data management model in response to determining a specified changed data node is the modification node;
modifying the data of the modification node based on the data modification profile of the modification node in the upgrade profile; and
storing modified data based on path information of the modification node in the updated data management model.

9. The data configuration method of claim 5, wherein configuring data for the one or more changed data nodes comprises storing data of a specified changed data node based on path information of the specified changed data node in the updated data management model in response to determining the specified changed data node is the second-type data node and is not the migration node.

10. The data configuration method of claim 1, wherein the upgrade profile, the original data management model, and the updated data management model are data tree structures.

11. A data configuration apparatus for a network device, comprising:
a processor configured to:
obtain a differential profile for one or more changed data nodes based on an original data management model and an updated data management model, wherein the one or more changed data nodes comprise a first-type data node that is deleted and a second-type data node that is added;
determine a change profile when a deletion node in the original data management model is an addition node in the updated data management model, wherein the change profile indicates a correspondence between path information of the deletion node in the original data management model and path information of the addition node in the updated data management model;
combine the deletion node and the addition node into a migration node, wherein the one or more changed data nodes further comprise the migration node;
determine an upgrade profile in response to obtaining the differential profile for the one or more changed data nodes, wherein the one or more changed data nodes are changed between the original data management model and the updated data management model, and wherein the upgrade profile indicates first path information of the first-type data node, second path information of the second-type data node, and an update operation of the one or more changed data nodes; and
automatically reconfigure corresponding data for the second-type data node based on the first path information, the second path information, and the update operation in the upgrade profile to permit the network device to upgrade from the original data management model to the updated data management mode without manual reconfiguration; and
a memory coupled to the processor and configured to store the upgrade profile.

12. The data configuration apparatus of claim 11, wherein the processor is further configured to:

obtain the differential profile including differences between the original data management model and the updated data management model, wherein the differential profile indicates the first-type data node deleted when generating the updated data management model from the original data management model and the first path information of the first-type data node in the original data management model, and indicates the second-type data node added when generating the updated data management model from the original data management model and the second path information of the second-type data node in the updated data management model; and
generate the upgrade profile based on the differential profile.

13. The data configuration apparatus of claim 12, wherein the processor is further configured to:
add the correspondence between the path information of the deletion node and the path information of the addition node in the updated data management model to the upgrade profile based on the change profile.

14. The data configuration apparatus of claim 13, wherein the processor is further configured to:
record a corresponding update operation of the migration node as migration; and
record path information of the migration node as path information of the migration node in the original data management model and path information of the migration node in the updated data management model in the upgrade profile.

15. The data configuration apparatus of claim 14, wherein the processor is further configured to:
record the migration node as a modification node in the upgrade profile when corresponding data of the migration node is modified; and
record a data modification profile of the modification node in the upgrade profile, wherein the one or more changed data nodes further comprise the modification node.

16. The data configuration apparatus of claim 14, wherein the processor is further configured to:
obtain data of a specified changed data node based on path information of the specified changed data node in the original data management model in response to determining the specified changed data node is a first type data node and not the migration node; and
delete the data of the specified changed data node.

17. The data configuration apparatus of claim 15, wherein the processor is further configured to:
obtain the corresponding data of the migration node based on the path information of the migration node in the original data management model in response to determining a specified changed data node is the migration node and not the modification node; and
store the corresponding data of the migration node based on the path information of the migration node in the updated data management model.

18. The data configuration apparatus of claim 15, wherein the processor is further configured to:
obtain data of the modification node based on path information of the modification node in the original data management model in response to determining a specified changed data node is the modification node;
modify the data of the modification node based on the data modification profile of the modification node in the upgrade profile; and store modified data based on path information of the modification node in the updated data management model.

19. The data configuration apparatus of claim 15, wherein the processor is further configured to store data of a specified changed data node based on path information of the specified changed data node in the updated data management model in response to determining the specified changed data node is the second-type data node and is not the migration node.

20. The data configuration apparatus of claim 11, wherein the upgrade profile, the original data management model, and the updated data management model are data tree structures.

\* \* \* \* \*

UNITED STATES PATENT AND TRADEMARK OFFICE
CERTIFICATE OF CORRECTION

PATENT NO. : 11,163,553 B2
APPLICATION NO. : 16/522166
DATED : November 2, 2021
INVENTOR(S) : Baochuan Cheng et al.

Page 1 of 1

It is certified that error appears in the above-identified patent and that said Letters Patent is hereby corrected as shown below:

In the Claims

Claim 1, Column 23, Line 39: "method fora network" should read "method for a network"

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*